Patented Apr. 3, 1923.

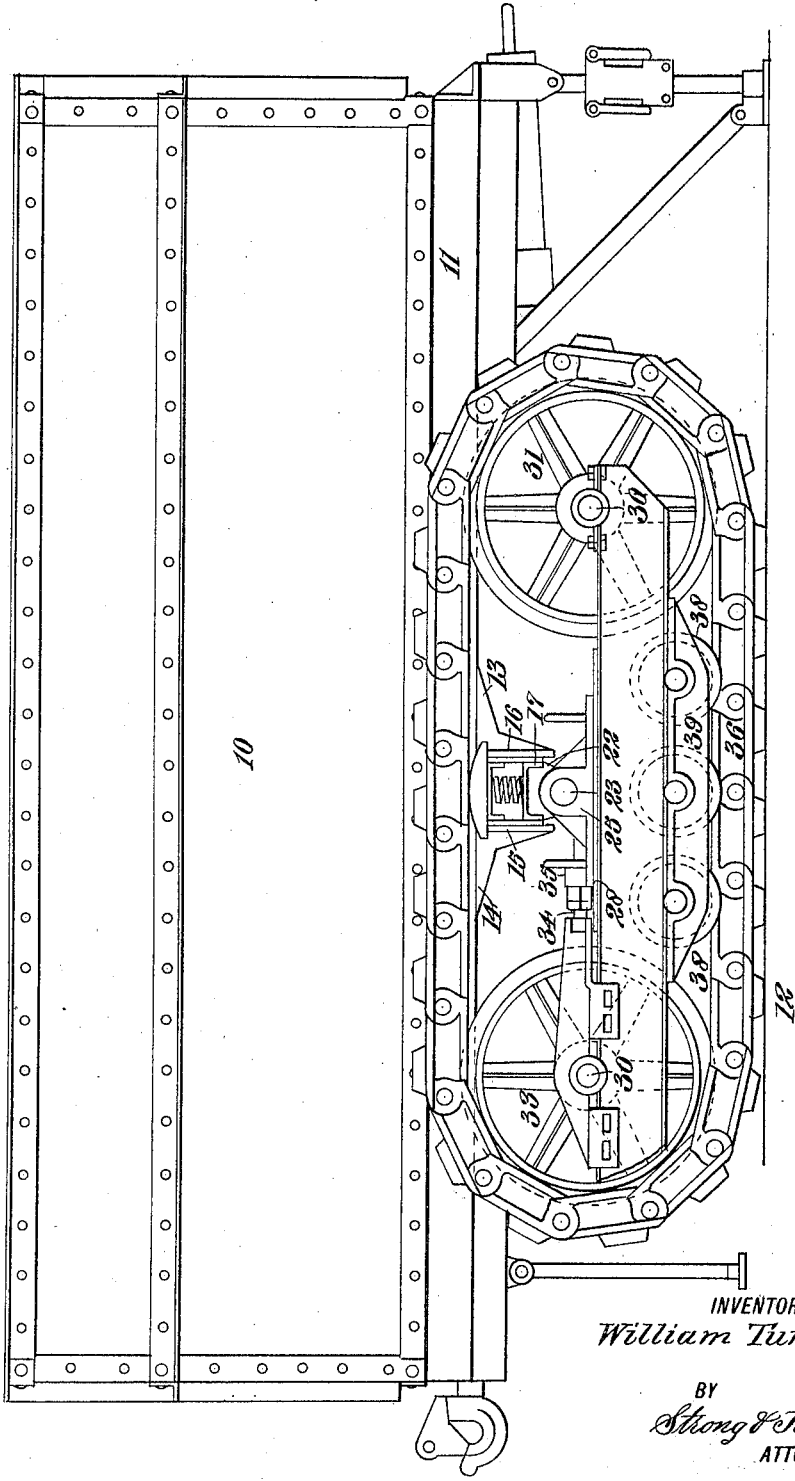

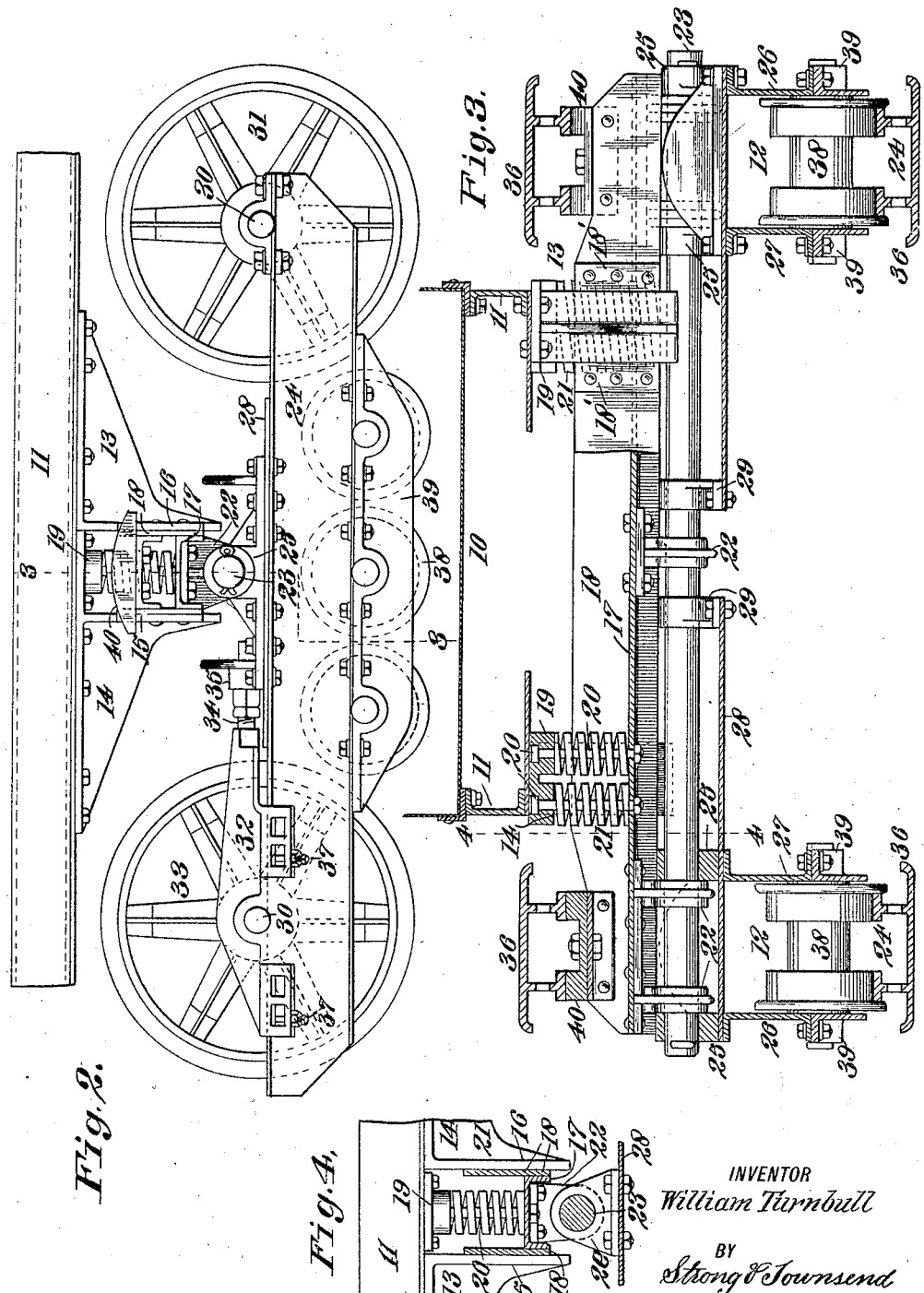

1,450,466

UNITED STATES PATENT OFFICE.

WILLIAM TURNBULL, OF PEORIA, ILLINOIS, ASSIGNOR TO THE HOLT MANUFACTURING COMPANY, OF STOCKTON, CALIFORNIA, A CORPORATION OF CALIFORNIA.

CHAIN-TRACK VEHICLE.

Application filed January 7, 1919. Serial No. 270,039.

*To all whom it may concern:*

Be it known that I, WILLIAM TURNBULL, a citizen of the United States, residing at Peoria, in the county of Peoria and State of Illinois, have invented new and useful Improvements in Chain-Track Vehicles, of which the following is a specification.

This invention relates to vehicles of the chain track variety, and pertains especially to a trailer wagon construction employing endless, self-laying tracks, although it will be manifest that the invention is applicable in other connections.

In a vehicle of the self-laying chain track type it has been a problem to provide track units which would be practical and simple in structure and would at the same time yieldably support the frame of the vehicle without imparting strains thereto due to the distortion of the frame incident to variations in the level and condition of the road over which the separate units were passing.

The present invention contemplates the use of a main frame carrying downwardly extending brackets between which a cross beam may slide in a vertical frame, said main frame being yieldably supported upon said cross beam, and said beam in turn carrying a stabilizer shaft at the opposite ends of which are pivoted roller truck frames carrying idler wheels at their ends and embraced by continuous chain tracks.

The present invention is to be distinguished from the ordinary type of pivoted trucks for chain track vehicles in the provision of the beam for carrying the stabilizer shaft and for supporting the load and the manner in which the load is yieldingly supported on this beam; also in the provision, in conjunction with the beam, of the means hereinafter to be described for supporting the upper run of the track belt in such fashion that the support is uniform, irrespective of the pivotal movements of the truck.

The invention is illustrated by way of example in the accompanying drawings, in which—

Fig. 1 is a view in side elevation illustrating the present invention as applied to a trailer.

Fig. 2 is an enlarged fragmentary view disclosing one of the trucks of the running gear and the mounting therefor.

Fig. 3 is a view in section and elevation, as seen on the line 3—3 of Fig. 2, particularly disclosing the transverse connection between the two track units and the main frame thereof.

Fig. 4 is a view in transverse section, as seen on the line 4—4 of Fig. 3, disclosing the manner in which the cross beam is slidably supported and the springs interposed between it and the main frame.

In the drawings, 10 indicates a vehicle body which may be of any preferred design and which is preferably supported upon a rigid main frame 11. This frame is formed of structural steel of channel shape and thus provides a rectangular frame for supporting the body end in connection with which track units 12 of the running gear may be mounted.

The side rails of the main frame are each fitted with downwardly extending brackets 13 and 14 which are spaced in relation to each other and provide guides 15 and 16 between which a cross beam 17 may slide. This beam is preferably of channel section disposed with its legs extending downwardly and parallel to the plates 15 and 16. Wear plates 18 are mounted upon the outer face of the channel and are interposed between the channel and the brackets, thus providing an enlarged bearing surface between channel and brackets and insuring that no twisting action will take place due to any distortion strains imparted to the beams. Guide rails 18' are fastened to the opposite wear strips and form guideways for the brackets.

Spring pads 19 are fastened between the brackets 13 and 14 and carry spring bolts 20. These bolts extend parallel to each other and pass through openings in the web of the beam 17. Helical springs 21 are mounted around each of said bolts and are disposed to rest upon the beams at their lower ends and to form a support for the spring pad 19 at their upper ends. Thus it will be seen that the bolts will act to prevent lateral movement of the beam in relation to the main frame and at the same time will provide the desirable vertical movement as affected by any irregularity of the roadway or any unequal loading of the vehicle.

Fastened to the beam 17 and disposed at intervals therebeneath are a series of hangers 22, as particularly shown in Figure 3. Two of these hangers are formed upon a single mounting plate and riveted to the beam at the opposite ends thereof, while a single hanger is fixed at the center of the beam and therebeneath. These hangers are provided with openings in alignment so that they may receive a stabilizing shaft 23. This shaft extends parallel to the beam 17 and is provided as a pivot support for the opposite roller truck frames 24, the frame being fitted with bearing standards 25 through which the shaft 23 extends.

As further disclosed in Figure 3 these standards are arranged upon the outer sides of the member 22 and thus prevent sidewise movement of the truck frame.

Each of the truck frames is preferably formed of channel members 26 and 27 secured in spaced relation to each other by cross plates 28. These plates are bolted to the upper faces of the channels and extend inwardly to carry bearings 29 which are held at the opposite sides of the central hanger 22 and through which the stabilizer shaft also passes. By this construction any sidewise twisting of the truck frames will be resisted and the tendency for the bearings 25 to bind will be overcome.

Mounted at one end of each of the truck frames is a bearing 30 which carries the axle of idler wheel 31. At the opposite end of each frame is a sliding bearing 32 carrying the axle of idler wheel 33. This bearing is provided with means for engaging the oppositely and downwardly extending upper legs of the frame channels and for permitting the bearings to slide therealong. An adjusting bolt 34 connects each of the bearings with a bracket 35 on the truck frames, thus allowing positive and accurate means for moving the bearing 32 and producing a desired tension in a chain tread track 36. It being understood that this track embraces both sets of wheels 31 and 33.

Clamp bolts 37 are carried by the bearings and may be brought into positive engagement with the flanges of the channels 26 and 27 to further locate the bearings and prevent sliding movement thereof.

In order to provide additional rigidity of the channel members and at the same time afford bearing support for load-supporting rollers 38 a multiple bearing bracket 39 is provided. One of these brackets is bolted to the lower legs of each of the channels and rotatably supports the spindles of a plurality of load-supporting rollers 38 which rollers bear upon the lower run of the chain track.

Chain supports 40 are provided the upper run of track and fixed to the extensions of the beam plates 18 as shown in Figure 3.

The upper faces of the supports 40 are curved and thus form a convex bearing surface for the upper run of the chain track as shown in Figure 1, thus insuring that any upward movement of the truck units will cause equal movement of a supporting member by which the upper run of chain track may be carried.

In operation the running gear is assembled as indicated in the drawings and the vehicle thereafter connected with a suitable tractor. It is to be understood however that the present structure is not limited to this form of vehicle which is drawn, but may be used in connection with self-propelled vehicles by properly substituting driving sprockets for certain of the idler wheels and affording motive power therefor. In the present instance however the vehicle will pass along the roadway and the separate truck units will individually swing upon the stabilizer shaft as controlled by the contour of the road.

It will be evident that these elements may be disposed at any angle to each other without impairing their usefulness. In the event that the roadway is not level one of the truck elements would be free to move upwardly and compress the springs 21 so that the beam 17 will be inclined at an angle to the horizontal. Due to this construction it will be possible for this beam to constantly vibrate as the vehicle travels and thus to absorb most of the vibrations incident to irregularities of the roadway and prevent objectionable strains and distortion from affecting the main frame of the vehicle. It will thus be seen that the running gear structure here disclosed is decidedly simple when the formation and assembly of its various elements is considered and highly desirable when its action and the simplicity of its mounting upon a vehicle is considered.

It will be observed that the beam member, made up of the elements 17—18 and which carries the cross pivot shaft 23, extends a substantial distance beyond the sides of the main frame and carries the guide shoes or supports 40 for the upper run of the track quite independently of the truck members.

It has usually been customary to support the upper run of the track on rollers or other means mounted on the trucks. The present method provides a uniform support for the upper run of the track, irrespective of the pivotal movement of its truck. Likewise the spring connectors 20, between the beam and the main frame, are disposed at points entirely outside of the planes of the tracks, a construction made possible only by the use of a structure or beam arrangement like that provided by the elements 17 and 18. Furthermore, this beam is of sufficient strength and rigidity as to withstand tendencies to twists and distortions.

It is manifest that various changes in form, proportions and details of construction may be made without departing from the spirit of the invention as disclosed in the appended claims.

Having thus described my invention what I claim and desire to secure by Letters Patent is:

1. In a track laying vehicle, a main frame, guide members extending downwardly therebeneath at each side thereof, a transverse load carrying beam slidably mounted between the guide members and extending beyond the same at each end, bearings mounted on the under side of said beam, spring members interposed between said beam and the main frame to afford resiliency in traversing uneven roadways, a roller truck frame at each side of the main frame located beneath the corresponding projecting end of the load carrying beam, bearings complemental to those on the beam located on the truck frames, and a shaft extending through said bearings on the beam and truck frames, respectively, to form a hinge connection, whereby the load on the main frame is transmitted to the truck frames through the beam.

2. In a track laying vehicle, a main frame, guide members extending downwardly therebeneath at opposite sides thereof, a transverse load carrying beam slidably mounted in the guide members and extending beyond the same at each end, spring supporting members interposed between the load carrying beam and the main frame, bearings carried by the beam beneath the same at each end thereof, a roller truck frame at each side of the main frame located beneath the corresponding projecting end of the load carrying beam and having bearings complemental to the bearings on the load carrying beam, a shaft extending through said complemental bearings at opposite ends of the beam, and an intermediate bearing on said beam for supporting the intermediate portion of the shaft, whereby said roller truck frames are permitted to oscillate about the shaft as a center and to move vertically with relation to the main frame, in unison with the load carrying beam.

3. In a track laying vehicle, a main frame, guiding members extending downwardly beneath and at each side thereof, a transverse load carrying beam slidably mounted for vertical movement between the guide members and extending beyond the same at each end, spring members interposed between the load carrying beam and the main frame, bearings carried by the beam on the under side thereof, a roller truck frame at each side of the main frame located beneath the corresponding projecting end of the load carrying beam, and having bearings complemental to the bearings on the under side of said beam, a shaft extending through said bearings on the beam and roller truck frames, respectively, and centrally located bearings on the beam and truck frames, respectively, through which the intermediate portion of the shaft extends, to resist independent lateral deflection in a vertical plane.

4. In a track laying vehicle, a main frame, guide members extending downwardly therebeneath, a transverse load carrying beam slidably mounted between the guide members and extending beyond the same at each end, spring members interposed between the load carrying beam and the main frame, a roller truck frame at each side of the main frame extending beneath the adjacent end of the load carrying beam, a hinge connection between each truck frame and the load carrying beam for transmitting the weight of the main frame to the truck frame and permitting the latter to rock freely in a vertical plane, said hinge connections comprising bearings on each truck frame, bearings on the overlying end of the load carrying beam co-operating with the first mentioned bearings in a manner to prevent relative movement transversely of the main frame, and a transverse shaft serving as a hinge pin for both sets of connections.

In testimony whereof I have hereunto set my hand.

WILLIAM TURNBULL.